US012784647B2

(12) United States Patent
Kim et al.

(10) Patent No.: US 12,784,647 B2
(45) Date of Patent: Nov. 3, 2026

(54) TIMING CONTROLLER AND DISPLAY DEVICE INCLUDING SAME

(71) Applicant: LG Display Co., Ltd., Seoul (KR)

(72) Inventors: Young Ho Kim, Paju-si (KR); Nan Yi Lee, Paju-si (KR); Hyun Taek Nam, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 19/381,912

(22) Filed: Nov. 6, 2025

(65) Prior Publication Data

US 2026/0212801 A1 Jul. 23, 2026

(30) Foreign Application Priority Data

Dec. 30, 2024 (KR) ........................ 10-2024-0200741

(51) Int. Cl.
*G09G 3/20* (2006.01)

(52) U.S. Cl.
CPC ..................... *G09G 3/2096* (2013.01); *G09G 2300/0814* (2013.01); *G09G 2300/0857* (2013.01); *G09G 2310/0267* (2013.01); *G09G 2310/0275* (2013.01); *G09G 2310/0286* (2013.01); *G09G 2310/0289* (2013.01); *G09G 2310/08* (2013.01); *G09G 2320/0285* (2013.01); *G09G 2330/021* (2013.01); *G09G 2330/025* (2013.01); *G09G 2330/06* (2013.01); *G09G 2370/08* (2013.01)

(58) Field of Classification Search
CPC ......... G09G 3/2096; G09G 2300/0814; G09G 2300/0857; G09G 2310/0267; G09G 2310/0275; G09G 2310/0286; G09G 2310/0289; G09G 2310/08; G09G 2320/0285; G09G 2330/021; G09G 2330/025; G09G 2330/06; G09G 2370/08
See application file for complete search history.

(56) References Cited

U.S. PATENT DOCUMENTS

| | | | | |
|---|---|---|---|---|
| 2020/0234675 A1* | 7/2020 | Huang | ..................... | G09G 3/20 |
| 2022/0148515 A1* | 5/2022 | Hong | ..................... | G09G 5/006 |
| 2022/0180814 A1* | 6/2022 | Jung | .................... | G09G 3/3275 |

FOREIGN PATENT DOCUMENTS

| | | |
|---|---|---|
| KR | 10-1957739 B1 | 3/2019 |
| KR | 10-2021-0085060 A | 7/2021 |
| KR | 10-2021-0157523 A | 12/2021 |
| KR | 10-2365310 B1 | 2/2022 |
| KR | 10-2576968 B1 | 9/2023 |

* cited by examiner

*Primary Examiner* — Hang Lin
(74) *Attorney, Agent, or Firm* — Birch, Stewart, Kolasch & Birch, LLP

(57) ABSTRACT

A display device can include a display panel, a data driver, and a timing controller that transmits various signals through an interface connected to the data driver, analyzes a pattern of input data, and controls output strength of at least one of VOD or PE. The timing controller includes a data storage that distributes and stores the input data and then outputs pattern data, a pattern detector that detects whether the pattern data includes data of 0 after consecutive 1s, and detects whether the pattern data includes data of 1 after consecutive 0s, a pattern determination circuit that decodes first pattern detection signals and second pattern detection signals and outputs VOD control signals and PE control signals, and a driver that controls the output strength of at least one of the VOD or PE based on the VOD and PE control signals.

18 Claims, 16 Drawing Sheets

FIG. 11

LUT

| Case | Data | VOD | PE |
|---|---|---|---|
| 1 | Pattern 1 | 2 Step ▾ | 2 Step ▾ |
| 2 | Pattern 2 | 1 Step ▾ | 1 Step ▾ |
| 3 | Pattern 3 | 1 Step ▾ | 2 Step ▾ |
| 4 | Pattern 4 | 2 Step ▾ | 1 Step ▾ |
| 5 | Pattern 5 | 1 Step ▾ | Not change |
| 6 | Pattern 6 | Not change | Not change |

TIMING CONTROLLER AND DISPLAY DEVICE INCLUDING SAME

CROSS-REFERENCE TO RELATED APPLICATION

This application claims priority to Korean Patent Application No. 10-2024-0200741, filed in the Republic of Korea on Dec. 30, 2024, which is hereby expressly incorporated by reference into the present application as if fully set forth herein.

BACKGROUND OF THE DISCLOSURE

Field of the Disclosure

The present disclosure relates to a timing controller and a display device including the same.

Discussion of the Related Art

As information technology develops, the market for display devices, which serve to convey information to users, is growing. Accordingly, the use of display devices such as light emitting display (LED) devices, quantum dot display (QDD) devices, and liquid crystal display (LCD) devices is increasing.

The display devices described above include a display panel including subpixels, a driver that outputs driving signals for driving the display panel, and a power supply that generates power to be supplied to the display panel or the driver.

The display devices described above can display images by causing selected subpixels to transmit light or directly emit light when driving signals, such as a scan signal and a data signal, are supplied to the subpixels formed on the display panel.

SUMMARY OF THE DISCLOSURE

Accordingly, the present disclosure is directed to a timing controller and a display device including the same that substantially obviate one or more problems due to limitations and disadvantages of the related art.

An object of the present disclosure is to achieve optimal current consumption by controlling the output strength of at least one of voltage of differential (VOD) or pre-emphasis (PE) in a communication interface capable of transmitting and receiving various signals based on a differential signal.

Another object of the present disclosure is to reduce power consumption and electromagnetic interference (EMI) radiation based on a method of varying VOD and PE according to data.

Additional advantages, objects, and features of the present disclosure will be set forth in part in the description which follows and in part will become apparent to those having ordinary skill in the art upon examination of the following or can be learned from practice of the present disclosure. The objectives and other advantages of the present disclosure can be realized and attained by the structure particularly pointed out in the written description and claims hereof as well as the appended drawings.

To achieve these objects and other advantages and in accordance with the purpose of the present disclosure, as embodied and broadly described herein, a display device includes a display panel configured to display an image, a data driver configured to drive the display panel, and a timing controller configured to transmit various signals through an interface connected to the data driver, analyze a pattern of input data, and control output strength of at least one of VOD or PE with respect to an initial value, wherein the timing controller includes a data storage configured to distribute and store the input data and then output pattern data, a pattern detector including a first pattern detector configured to detect whether the pattern data output from the data storage includes data of 0 after consecutive 1s, and a second pattern detector configured to detect whether the pattern data includes data of 1 after consecutive 0s, a pattern determination circuit configured to decode first pattern detection signals output from the first pattern detector and second pattern detection signals output from the second pattern detector and output VOD control signals and PE control signals, and a driver configured to control the output strength of at least one of the VOD or PE based on the VOD control signals and the PE control signals output from the pattern determination circuit.

According to aspects of the present disclosure, the data storage can include a first data storage configured to temporarily store the input data and then output the input data unmodified to an input terminal of the driver of the timing controller, and a second data storage configured to distribute and store the input data and then output the pattern data.

According to aspects of the present disclosure, the first data storage and the second data storage can be configured using D flip-flops each including a data input terminal to which data is input, a data output terminal through which data is output, a clock input terminal to which a clock signal is input, and a reset input terminal to which a reset signal is input.

According to aspects of the present disclosure, the first pattern detector can include a first logic circuit configured to perform AND and NOT operations on the pattern data for each unit interval (UI).

According to aspects of the present disclosure, the first pattern detector can further include first D flip-flops configured to delay AND gate output signals output through the AND operation for one clock and output the delayed AND gate output signals as the first pattern detection signals.

According to aspects of the present disclosure, the second pattern detector can include a second logic circuit configured to perform OR and NOT operations on the pattern data for each UI.

According to aspects of the present disclosure, the second pattern detector can further include second D flip-flops configured to delay OR gate output signals output through the OR operation for one clock and output the delayed OR gate output signals as the second pattern detection signals.

According to aspects of the present disclosure, the pattern determination circuit can include a decoder configured to decode the first pattern detection signals output from the first pattern detector and the second pattern detection signals output from the second pattern detector, and D flip-flops configured to delay signals output from the decoder for one clock and output the delayed signals as the VOD control signals and the PE control signals.

In another aspect of the present disclosure, a timing controller includes a data storage configured to distribute and store input data and then output pattern data, a pattern detector including a first pattern detector configured to detect whether the pattern data output from the data storage includes data of 0 after consecutive 1s, and a second pattern detector configured to detect whether the pattern data includes data of 1 after consecutive 0s, a pattern determination circuit configured to decode first pattern detection signals output from the first pattern detector and second pattern detection signals output from the second pattern detector and output VOD control signals and PE control signals, and a driver configured to control the output strength of at least one of VOD or PE based on the VOD control signals and the PE control signals output from the pattern determination circuit.

According to aspects of the present disclosure, the first pattern detector can include a first logic circuit configured to perform AND and NOT operations on the pattern data for each UI, and first D flip-flops configured to delay AND gate output signals output through the AND operation for one clock and output the delayed AND gate output signals as the first pattern detection signals.

According to aspects of the present disclosure, the second pattern detector can include a second logic circuit configured to perform OR and NOT operations on the pattern data for each UI, and second D flip-flops configured to delay OR gate output signals output through the OR operation for one clock and output the delayed OR gate output signals as the second pattern detection signals.

According to aspects of the present disclosure, the pattern determination circuit can include a decoder configured to decode the first pattern detection signals output from the first pattern detector and the second pattern detection signals output from the second pattern detector, and D flip-flops configured to delay signals output from the decoder for one clock and output the delayed signals as the VOD control signals and the PE control signals.

It is to be understood that both the foregoing general description and the following detailed description of the present disclosure are exemplary and explanatory and are intended to provide further explanation of the present disclosure as claimed.

BRIEF DESCRIPTION OF THE DRAWINGS

The accompanying drawings, which are included to provide a further understanding of the present disclosure and are incorporated in and constitute a part of this application, illustrate embodiment(s) of the present disclosure and together with the description serve to explain the principle of the present disclosure. In the drawings:

FIG. 11 is a diagram showing a lookup table in which some patterns shown in FIG. 10 are arranged for cases;

DETAILED DESCRIPTION OF THE EMBODIMENTS

Figure 1:
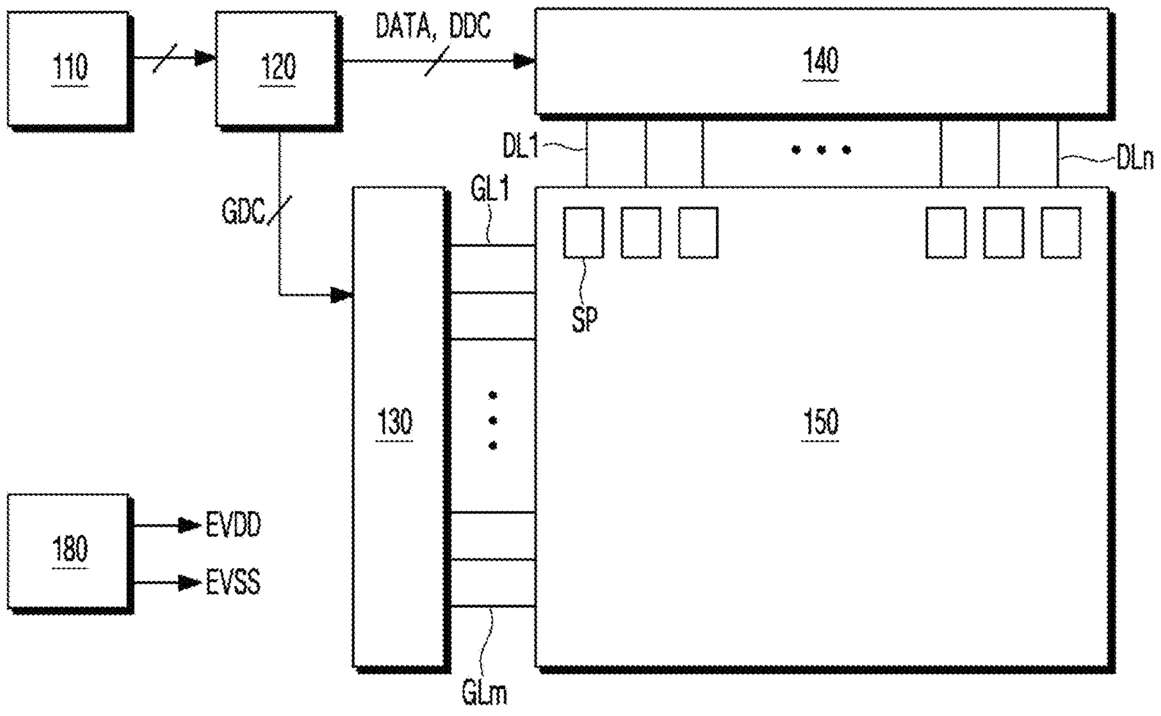
FIG. 1 is a block diagram schematically showing a light-emitting display device according to aspects of the present disclosure.

Reference is now made in detail to embodiments of the present disclosure, examples of which can be illustrated in the accompanying drawings.

Features of various embodiments of the present disclosure can be partially or entirely coupled to or combined with each other and can be operated, linked, or driven together in various ways. Embodiments of the present disclosure can be carried out independently from each other, or can be carried out together in co-dependent or related relationship.

Further, the term "can" fully encompasses all the meanings and coverages of the term "may" and vice versa.

All the components of each display device or apparatus according to all embodiments of the present disclosure are operatively coupled and configured.

A display device according to aspects of the present disclosure can be implemented as a television, a video player, a personal computer (PC), a home theater, an automobile electrical device, a smartphone, etc., but is not limited thereto. The display device according to the present disclosure can be implemented as a light emitting display (LED) device, a quantum dot display (QDD) device, a liquid crystal display (LCD) device, etc. However, for convenience of description, a light emitting display device that directly emits light based on inorganic light-emitting diodes or organic light-emitting diodes is used as an example of the display device below.

In addition, a transistor which will be described below can be implemented as an n-type transistor, a p-type transistor, or a combination of n-type and p-type transistors. The transistor is a three-electrode element including a gate, a source, and a drain. The source is an electrode that supplies carriers to the transistor. In the transistor, carriers start to flow from the source. The drain is an electrode through which carriers are discharged from the transistor. In other words, carriers flow from the source to the drain in the transistor.

In the case of a p-type transistor, carriers are holes, and thus the source voltage is higher than the drain voltage such that the holes can flow from the source to the drain. Since the holes flow from the source to the drain in the p-type transistor, the current flows from the source to the drain. On the other hand, in the case of an n-type transistor, carriers are electrons, and thus the source voltage is lower than the drain voltage such that the electrons can flow from the source to the drain. Since the electrons flow from the source to the drain in the n-type transistor, the current flows from the drain to the source. However, the source and drain of the transistor can be changed depending on the applied voltage. Considering this, one of the source and drain is described as a first electrode, and the other of the source and drain is described as a second electrode in the following description.

Now, various embodiments of the present disclosure will be discussed referring to the drawings.

Figure 2:
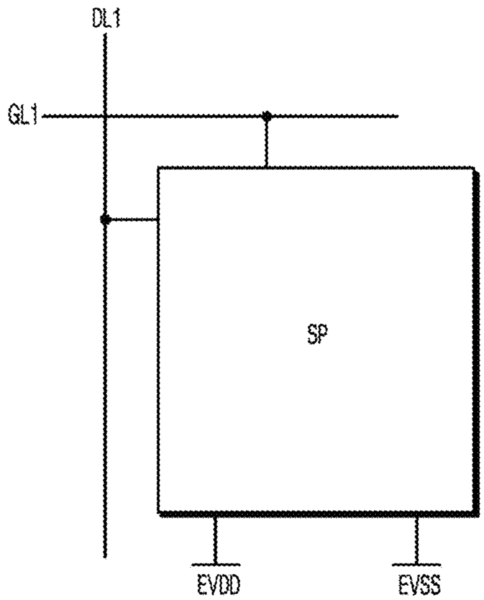
FIG. 2 is a block diagram schematically showing a subpixel shown in FIG. 1.

FIG. 1 is a block diagram schematically showing a light-emitting display device according to aspects of the present disclosure, and FIG. 2 is a block diagram schematically showing a subpixel shown in FIG. 1.

As shown in FIG. 1 and FIG. 2, the light-emitting display device can include a timing controller 120, a gate driver (gate driving circuit) 130, a data driver (data driving circuit) 140, a display panel 150, and a power supply 180.

An image provider (set or host system) 110 can output various driving signals in addition to external image data signals or image data signals (data signals) stored in an internal memory. The image provider 110 can supply data signals and various driving signals to the timing controller 120.

The timing controller 120 can output a gate timing control signal GDC for controlling the operation timing of the gate driver 130, a data timing control signal DDC for controlling the operation timing of the data driver 140, and various synchronization signals. The timing controller 120 can supply a data signal DATA supplied from the image provider 110 along with the data timing control signal DDC to the data driver 140. The timing controller 120 can be formed as an integrated circuit (IC) and mounted on a printed circuit board, but is not limited thereto.

The gate driver 130 can output a gate signal (or gate voltage) in response to the gate timing control signal GDC supplied from the timing controller 120. The gate driver 130 can supply gate signals to subpixels included in the display panel 150 through gate lines GL1 to GLm. Here, m can be a real number, e.g., a positive integer. The gate driver 130 can be formed as an IC or can be formed directly on the display panel 150 in a gate-in panel structure, but is not limited thereto.

The data driver 140 can sample and latch a data signal DATA in response to the data timing control signal DDC supplied from the timing controller 120, convert a digital data signal into an analog data voltage based on a gamma reference voltage, and output the same. The data driver 140 can supply a data voltage to subpixels included in the display panel 150 through data lines DL1 to DLn. Here, n can be a real number, e.g., a positive integer. The data driver 140 can be formed as an IC and mounted on the display panel 150 or on a printed circuit board, but is not limited thereto.

The power supply 180 can generate a high-level voltage and a low-level voltage based on an external input voltage, and output the same through a high-level power line EVDD and a low-level power line EVSS. The power supply 180 can generate and output voltages (gate high voltage and gate low voltage) required to drive the gate driver 130 and voltages required to drive the data driver 140 as well as the high-level voltage and the low-level voltage.

The display panel 150 can display an image in response to driving signals including a gate signal and a data voltage, and driving voltages including a high-level voltage and a low-level voltage. The subpixels of the display panel 150 directly emit light. The display panel 150 can be manufactured based on a rigid or flexible substrate such as a glass, silicon, or polyimide substrate. The subpixels that emit light can be composed of red, green, and blue subpixels, or red, green, blue, and white subpixels.

For example, one subpixel SP can be connected to the first data line DL1, the first gate line GL1, the high-level power line EVDD, and the low-level power line EVSS, and can include a pixel circuit composed of a switching transistor, a driving transistor, a capacitor, and an organic light-emitting diode. The subpixel SP used in the light-emitting display device directly emits light and thus has a complicated circuit configuration. In addition, a compensation circuit that compensates for deterioration of the driving transistor that supplies a driving current necessary to drive the organic light-emitting diode as well as the organic light-emitting diode that emits light also has a complicated configuration. Therefore, the subpixel SP is simply illustrated in the form of a block.

Meanwhile, in the above description, the timing controller 120, the gate driver 130, and the data driver 140 have been described as individual components. However, one or more of the timing controller 120, the gate driver 130, and the data driver 140 can be integrated into one IC depending on implementation of the light-emitting display device.

Figure 3:
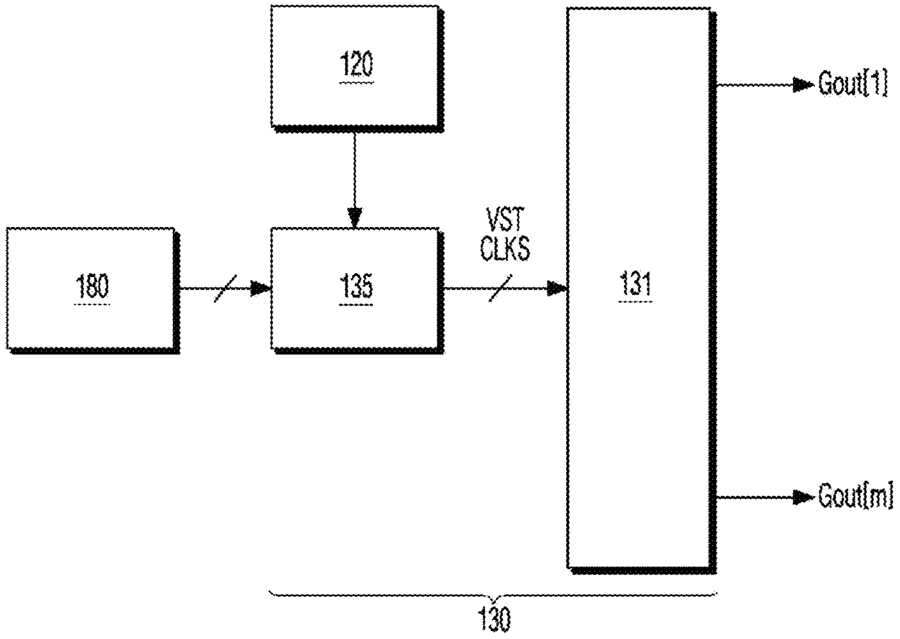
FIG. 3 and FIG. 4 are diagrams for describing configurations of a gate-in-panel type gate driver according to aspects of the present disclosure.
Figure 4:
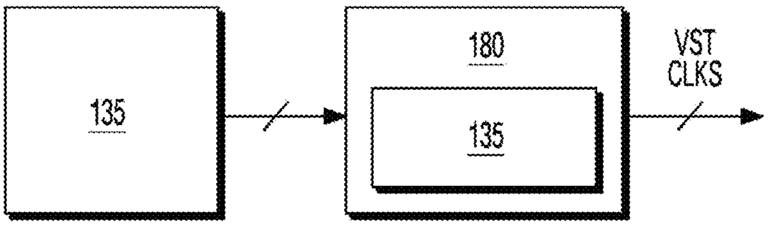
Figure 5:
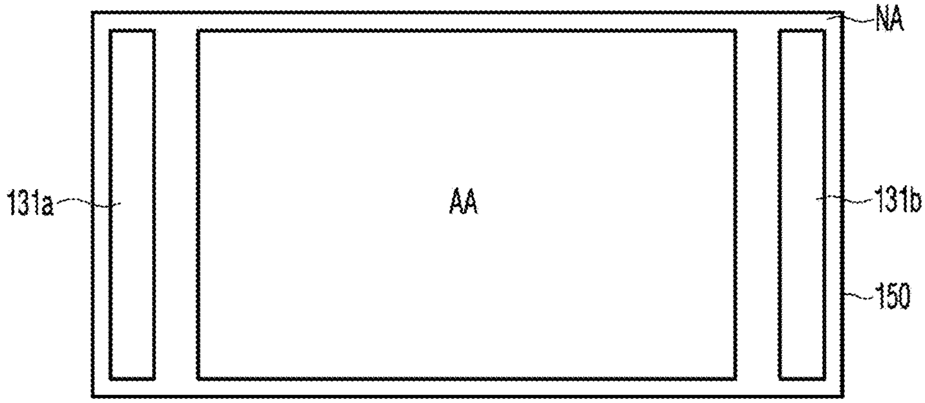
FIG. 5 is a diagram showing an example of disposition of the gate-in-panel type gate driver according to aspects of the present disclosure.

FIG. 3 and FIG. 4 are diagrams for describing configurations of a gate-in-panel type gate driver according to aspects of the present disclosure, and FIG. 5 is a diagram showing an example of disposition of the gate-in-panel type gate driver according to aspects of the present disclosure.

As shown in FIG. 3, the gate-in-panel type gate driver 130 can include a shift register 131 and a level shifter 135. The level shifter 135 can generate clock signals CLKS and a start signal VST based on signals and voltages output from the timing controller 120 and the power supply 180.

The clock signals CLKS can be output through clock signal lines, and the start signal VST can be output through a start signal line. The shift register 131 can operate based on the clock signals CLKS and the start signal VST and can output gate signals Gout[1] to Gout[m].

As shown in FIG. 3 and FIG. 4, the level shifter 135 can be formed independently as an IC, unlike the shift register 131, or can be included within the power supply 180. However, this is merely an example and the present disclosure is not limited thereto.

As shown in FIG. 5, first and second shift registers 131*a* and 131*b* that output gate signals in the gate-in-panel type gate driver can be disposed in non-active areas NA on the left and right sides of an active area AA of the display panel 150 in which an image is displayed. The first and second shift registers 131*a* and 131*b* can be formed as a thin film on the display panel 150 in a gate-in-panel structure.

Figure 6:
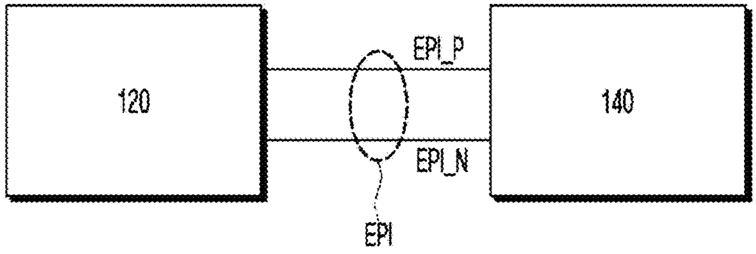
FIG. 6 is a diagram for describing a communication interface defined between a timing controller and a data driver according to aspects of the present disclosure.
Figure 7:
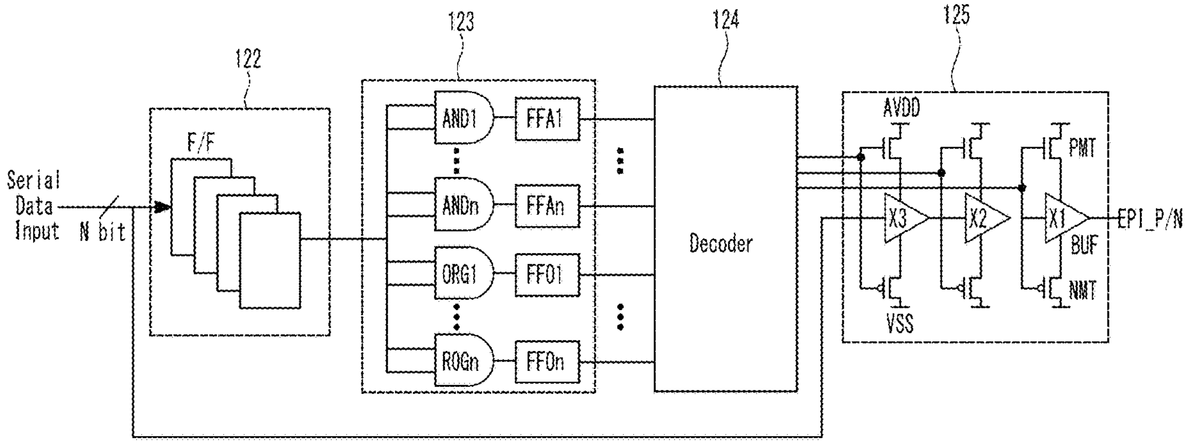
FIG. 7 is a diagram showing an interface circuit included in a timing controller according to a first embodiment of the present disclosure.
Figure 8:
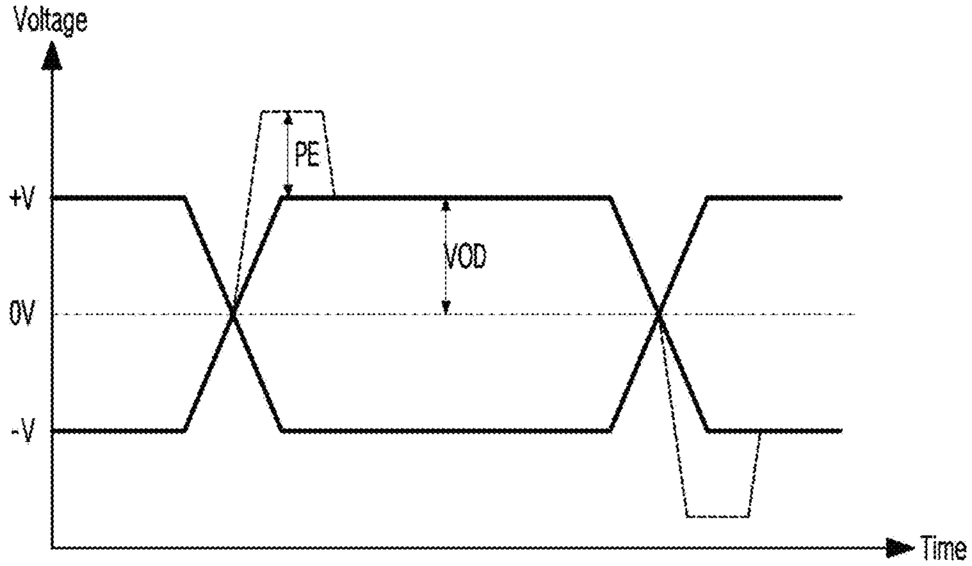
FIG. 8 is a diagram showing changes in output due to the operation of the interface circuit according to the first embodiment of the present disclosure.

FIG. 6 is a diagram for describing a communication interface defined between the timing controller and the data driver according to aspects of the present disclosure, FIG. 7 is a diagram showing an interface circuit included in the timing controller according to a first embodiment of the present disclosure, and FIG. 8 is a diagram showing changes in output due to the operation of the interface circuit according to the first embodiment.

As shown in FIG. 6 to FIG. 8, the timing controller 120 and the data driver 140 can exchange various signals through data communication. For example, the timing controller 120 and the data driver 140 can exchange various signals through an Embedded Clock Point-Point Interface (EPI) based on embedded clocks. The EPI can include a first transmission line EPI_P through which a positive signal is transmitted and a second transmission line EPI_N through which a negative signal is transmitted. Therefore, the EPI can transmit and receive various signals based on a differential signal including a positive signal and a negative signal.

The timing controller 120 can be defined as a signal transmitter because it serves to transmit various signals, and the data driver can be defined as a signal receiver because it serves to receive various signals transmitted from the timing controller 120.

According to the first embodiment, the timing controller 120 can include an interface circuit composed of a data storage 122, a pattern detector 123, a pattern determination circuit 124, and a driver 125 which are related to signal transmission.

The data storage 122 can store N-bit serial data (Serial Data Input) input from the outside. For example, the data storage 122 can be implemented as a data buffer such as a flip-flop F/F.

The pattern detector 123 can detect presence or absence of consecutive 0s or 1s in the serial data stored in the data storage 122. The pattern detector 123 can detect presence or absence of consecutive 0s or 1s in the serial data based on a technique for analyzing presence or absence of a high/low pattern. For example, the pattern detector 123 can be implemented as a combination of logic circuits such as AND gates AND1 to ANDn, first flip-flops FFA1 to FFAn, OR gates ORG1 to ORGn, and second flip-flops FFO1 to FFOn.

The pattern determination circuit 124 can receive information on the presence or absence of a pattern signal regarding consecutive 0s or 1s from the pattern detector 123, and determine whether the pattern is a target for VOD (Voltage Of Differential) and PE (Pre-emphasis) adjustment on the EPI based on the received information. The pattern determination circuit 124 can output a control signal based on the determination result. For example, the pattern determination circuit 124 can be implemented as a decoder.

The driver 125 can generate a differential voltage such that various signals can be transmitted through the first transmission line EPI_P and the second transmission line EPI_N constituting the EPI. In addition, the driver 125 can adjust (change) the output strength of at least one of VOD and PE of a differential voltage constituting a differential signal based on the control signal output from the pattern determination circuit 124. For example, the driver 125 can be implemented using buffers BUF, p-type transistors PMT, and n-type transistors NMT.

The consumption current of the driver 125 can vary depending on the level of a differential voltage including a positive voltage (+V) and a negative voltage (−V). Therefore, the VOD and PE for the differential voltage can be set to have sufficient margin to secure desirable EYE characteristics (e.g., various parameters in Eye Diagram) under all conditions. However, if only the initial values are used, various problems can occur.

Therefore, the first embodiment of the present disclosure provides the following operation flow to achieve optimal current consumption by adjusting the output strength of at least one of the VOD and PE according to input serial data and to reduce power consumption and EMI radiation compared to the existing driving methods.

Figure 9:
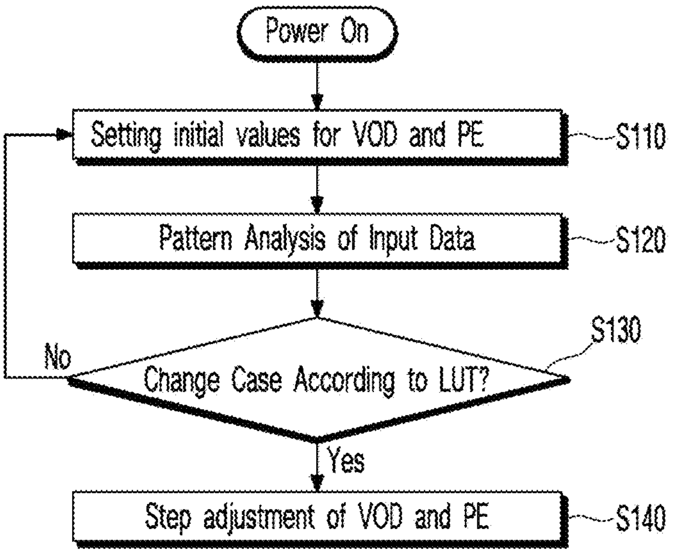
FIG. 9 is a flowchart for describing a part of the operation of the interface circuit according to the first embodiment of the present disclosure.
Figure 10:
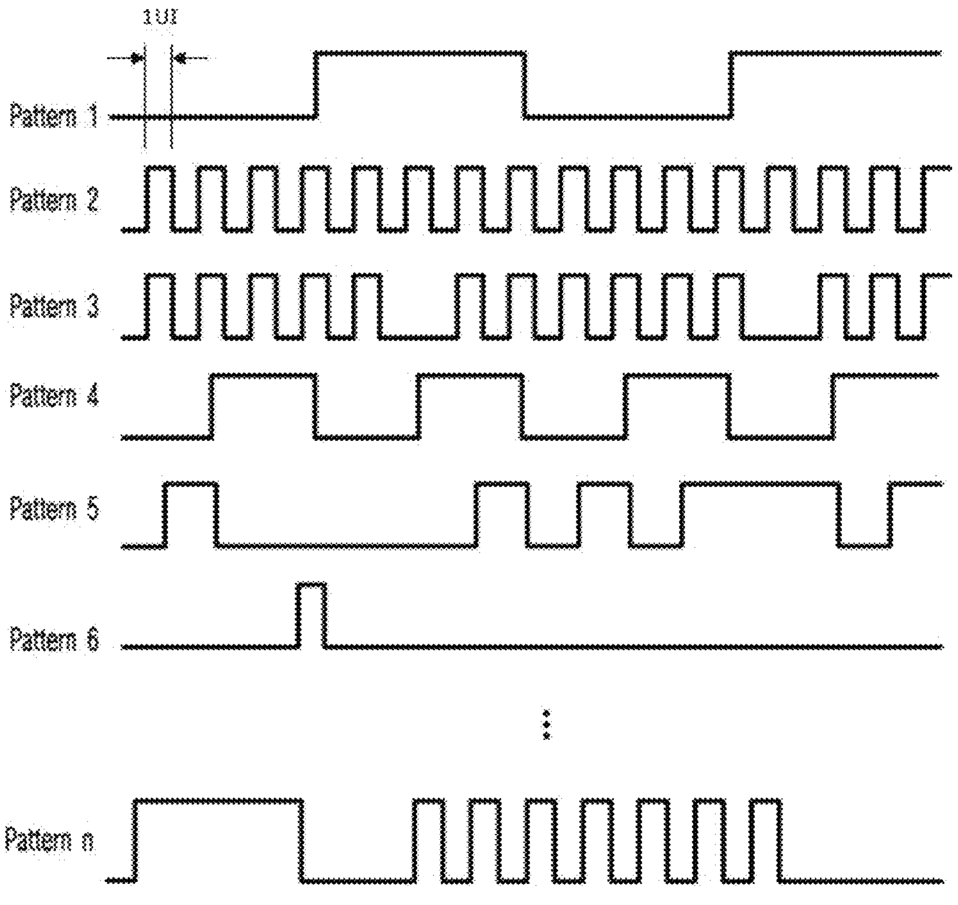
FIG. 10 is a diagram showing examples of patterns included in serial data.

FIG. 9 is a flowchart for describing a part of the operation of the interface circuit according to the first embodiment, FIG. 10 is a diagram showing examples of patterns included in serial data according to aspects of the present disclosure, and FIG. 11 is a diagram showing a lookup table in which some patterns shown in FIG. 10 are arranged for cases according to aspects of the present disclosure.

As shown in FIG. 7 to FIG. 11, when power is applied to the timing controller 120, the devices 122, 123, 124, and 125 included in the signal transmitter can operate as follows.

First, initial values for the VOD and PE can be set (S110). The initial values for the VOD and PE can be prepared through experiments. For example, the initial values for the VOD and PE can have different values for light-emitting display devices, such as the device conditions of the timing controller 120 and the data driver 140, driving environments, and transmission lines provided therebetween.

Next, the pattern of input serial data can be analyzed (S120). For example, the input serial data can have various forms such as a first pattern Pattern 1 to an Nth pattern Pattern n, and there can be a target (candidate group) for controlling the output strength of at least one of the VOD or PE among the patterns. Therefore, through experiments, some (main patterns) of the first pattern Pattern 1 to the Nth pattern Pattern n can be arranged for cases and provided in the form of a lookup table LUT.

Next, case change can be determined according to the lookup table LUT (S130). If the result of analyzing the patterns of the input serial data is related to change case according to the lookup table LUT (YES), the output strength of at least one of the VOD or PE can be controlled to reduce power consumption and EMI radiation during data signal transmission (S140). However, if the analysis result is not related to change case according to the lookup table LUT (NO), the output strength of at least one of the VOD or PE may not be controlled (the previous value or the initial value can be maintained), and the process can return to the initial value setting step S110.

According to the patterns Pattern 1 to Pattern N illustrated in FIG. 10, the first pattern Pattern 1 has no 1 UI (Unit Interval) toggle and can be defined as a pattern with a sufficient margin when VOD decreases. The second pattern Pattern 2 is a best case among 1 UI toggle patterns and can be defined as a pattern with a margin when VOD and PE decrease. The third pattern Pattern 3 and the fourth pattern Pattern 4 can be defined as patterns in which a low state is maintained for 2 UIs or more and PE is required to increase. The fifth pattern Pattern 5 can be defined as a pattern with insufficient VOD and PE margins compared to the fourth pattern Pattern 4. The sixth pattern Pattern 6 can be defined as the worst pattern with only a 1 UI toggle. The Nth pattern Pattern N can be defined as a pattern that includes the characteristics of the first pattern Pattern 1 and the second pattern Pattern 2.

According to the lookup table LUT illustrated in FIG. 11, if the pattern of the input serial data is analyzed as the first pattern Pattern 1, the VOD and PE can be lowered by 2 steps each. On the other hand, if the pattern of the input serial data is the fifth pattern Pattern 5, the VOD can be lowered by 1 step, but PE may not be changed. If the pattern is the sixth pattern Pattern 6, the VOD and PE may not be changed and can maintain previous values thereof.

Meanwhile, the degree of change in the VOD and PE depends on the toggle bit (or toggling level). The final result can be applied based on the case with the least degree of change. For example, in FIG. 10 and FIG. 11, when the first pattern Pattern 1, the second pattern Pattern 2, and the fifth pattern Pattern 5 are sequentially input, the fifth pattern Pattern 5 with the least degree of change thereamong can be selected as a case change.

However, FIG. 10 and FIG. 11 are examples that illustrate some of various patterns and present some thereof as cases in a lookup table to aid in understanding of the first embodiment, and the present disclosure is not limited thereto.

In addition, the timing controller can be implemented to exchange various signals with multiple data drivers instead of a single data driver. In this case, the flow of FIG. 9 can be performed for each data driver.

As described above, the devices 122, 123, 124, and 125 included in the signal transmitter operate based on at least the flow as above to achieve optimal current consumption through output strength control for at least one of VOD or PE, and reduce power consumption and EMI radiation compared to the existing driving methods.

Hereinafter, implementation examples of the devices 122, 123, 124, and 125 included in the signal transmitter will be described.

Figure 12:
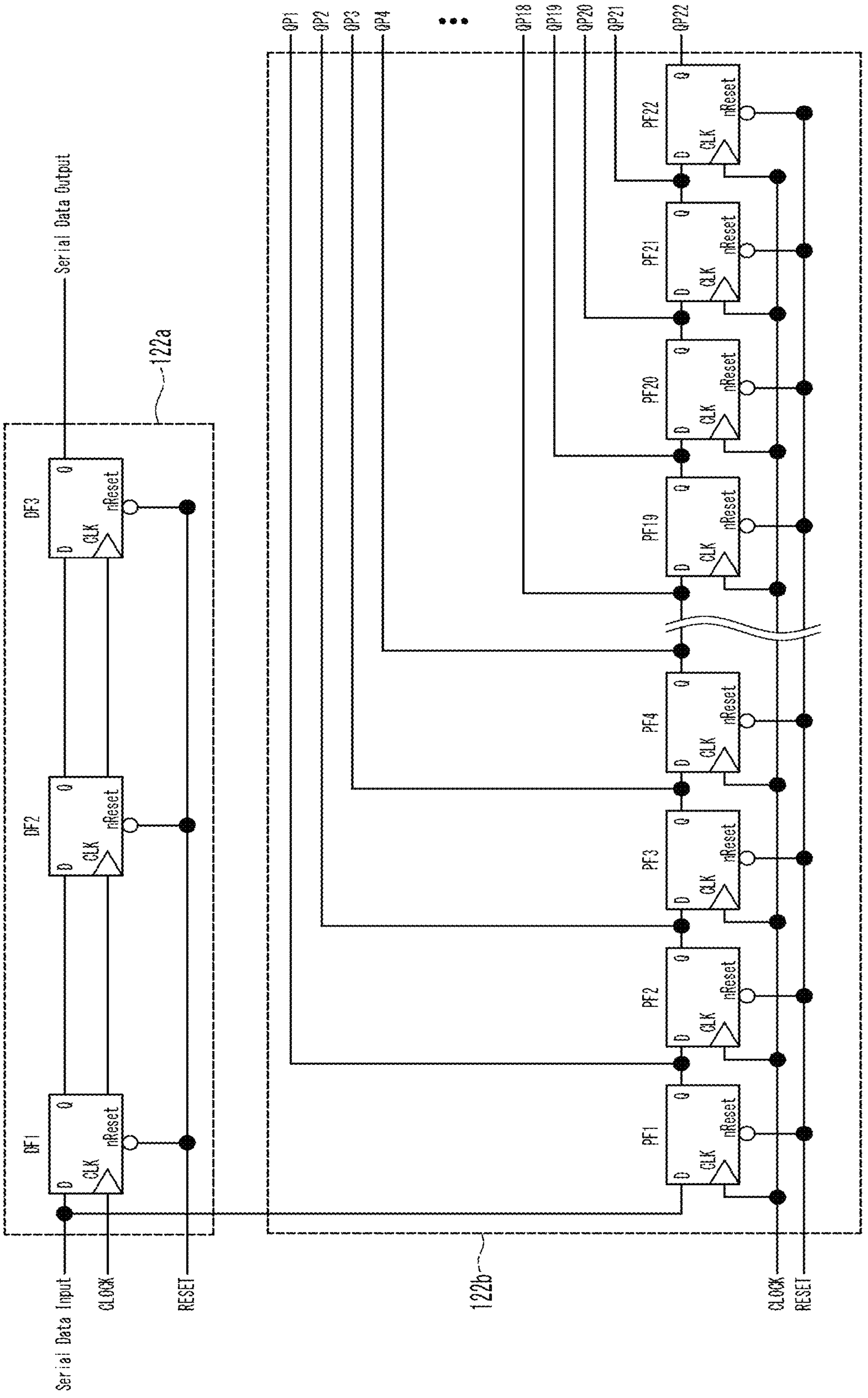
FIG. 12 shows an example of implementation of a data storage illustrated in FIG. 7 according to a second embodiment of the present disclosure.
Figure 13:
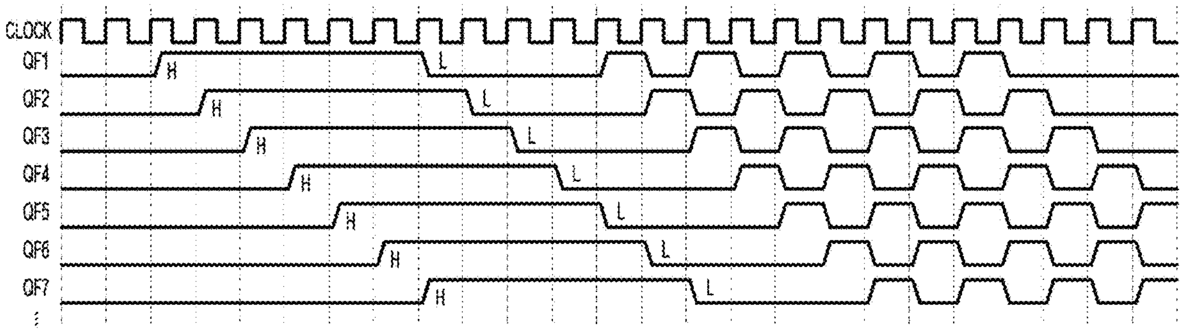
FIG. 13 shows examples of pattern data output from a second data storage of FIG. 12.

FIG. 12 shows an example of implementation of the data storage illustrated in FIG. 7 according to a second embodiment of the present disclosure, and FIG. 13 shows examples of pattern data output from a second data storage of FIG. 12 according to the second embodiment.

The data storage 122 illustrated in FIG. 7 can include a first data storage 122*a* and a second data storage 122*b*, as illustrated in FIG. 12. The first data storage 122*a* and the second data storage 122*b* can be implemented based on D flip-flops DF1 to DF3 and PF1 to PF22 each including a data input terminal D, a data output terminal Q, a clock input terminal CLK, and a reset input terminal nReset.

The first data storage 122*a* can temporarily store external serial data (Serial Data Input) and then output the same. The serial data (Serial Data Input) stored in the first data storage 122*a* can be output without any change (Serial Data Output) and applied to the driver.

The first data storage 122*a* can be implemented based on three D flip-flops DF1 to DF3 (hereinafter, it may also be referred to as a (1-1)th data storage flip-flop DF1 to a (1-3)th data storage flip-flop DF3) that operate based on a clock signal CLOCK and a reset signal RESET. The (1-1)th data storage flip-flop DF1 to the (1-3)th data storage flip-flop DF3 can operate in response to the clock signal CLOCK to delay the serial data and transmit the delayed serial data to the next stage. For example, the serial data transmitted from the (1-1)th data storage flip-flop DF1 to the (1-2)th data storage flip-flop DF2 can have an output delay of 1 clock for pattern detection time. In addition, the serial data transmitted from the (1-2)th data storage flip-flop DF2 to the (1-3)th data storage flip-flop DF3 can have an output delay of 1 clock for calculation of VOD and PE setting values.

The second data storage 122*b* can separate/distribute and store serial data supplied from the outside in order to analyze the pattern of the serial data, and then output the same. The serial data (Serial Data Input) stored in the first data storage 122*a* can be configured as pattern data QP1 to QP22 and applied to the pattern detector.

The second data storage 122 *b* can be implemented based on 22 D flip-flops PF1 to PF22 (hereinafter, it may also be referred to as a (2-1)th data storage flip-flops PF1 to a (2-22)th data storage flip-flops PF22) that operate based on a clock signal CLOCK and a reset signal RESET. The (2-1)th data storage flip-flops PF1 to the (2-22)th data storage flip-flops PF22 operate in response to the clock signal CLOCK and can extract and output one piece of data at a time, such as the first pattern data QP1 to the 22nd pattern data QP22 from the serial data (Serial Data Input).

For example, if data is input in the form of the Nth pattern Pattern n of FIG. 10, the second data storage 122*b* can configure a signal such that the signal is delayed by the number of clocks corresponding to the number of flip-flops and output the same in the form of the first pattern data QP1 to the seventh pattern data QP7 of FIG. 13.

Meanwhile, FIG. 12 shows an example of the configuring the second data storage 122*b* based on 22 D flip-flops PF1 to PF22 as the input serial data (Serial Data Input) has a maximum of 22 UIs, and the present disclosure is not limited thereto.

Figure 14:
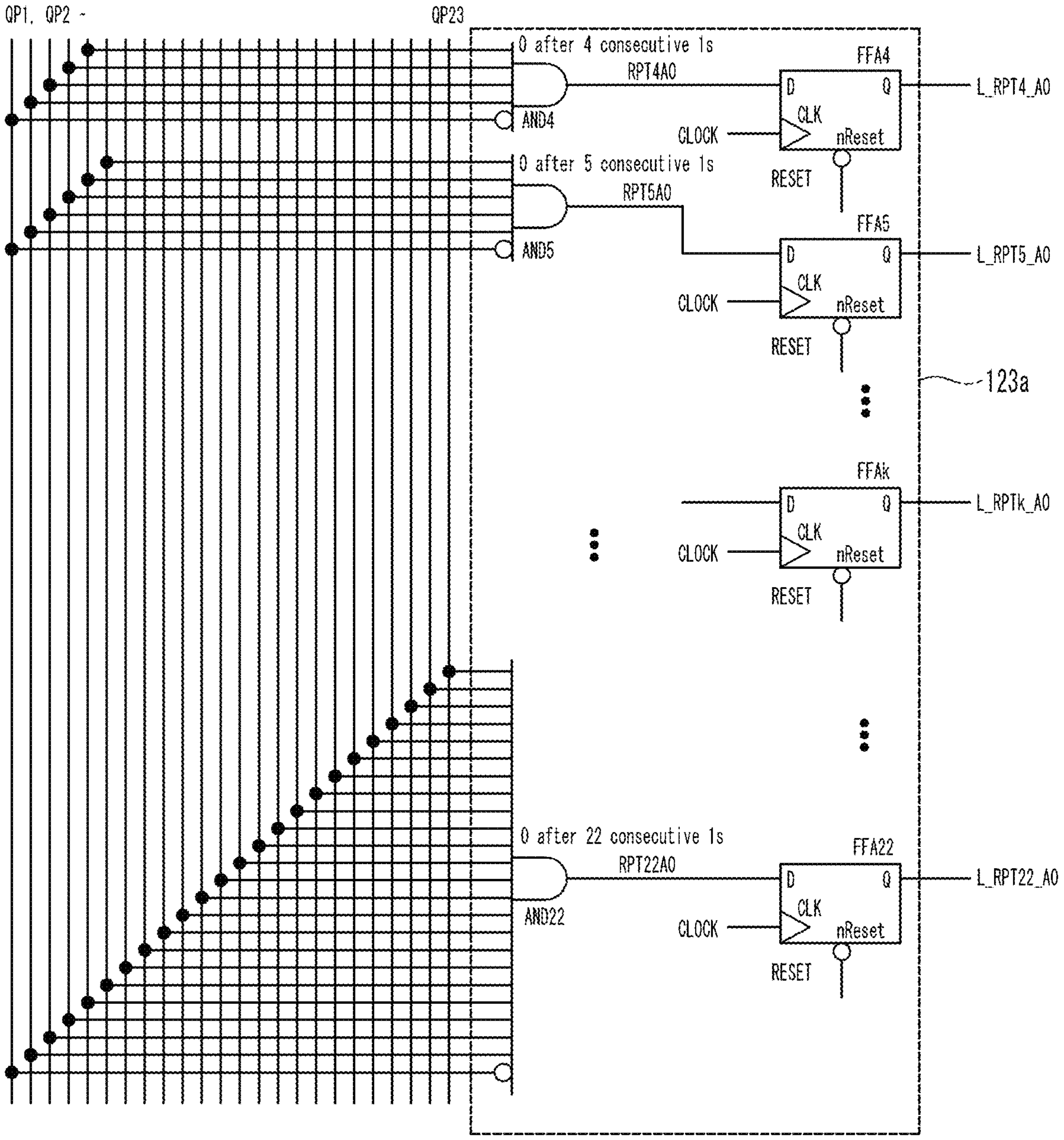
FIG. 14 and FIG. 16 show examples of implementation of a first pattern detector and a second pattern detector illustrated in FIG. 7 according to the second embodiment of the present disclosure.
Figure 15:
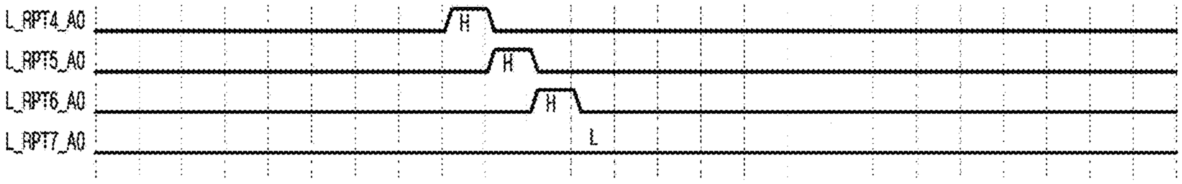
FIG. 15 and FIG. 17 show examples of first pattern detection signals and second pattern detection signals output from the first pattern detector and the second pattern detector of FIG. 14 and FIG. 16.
Figure 16:
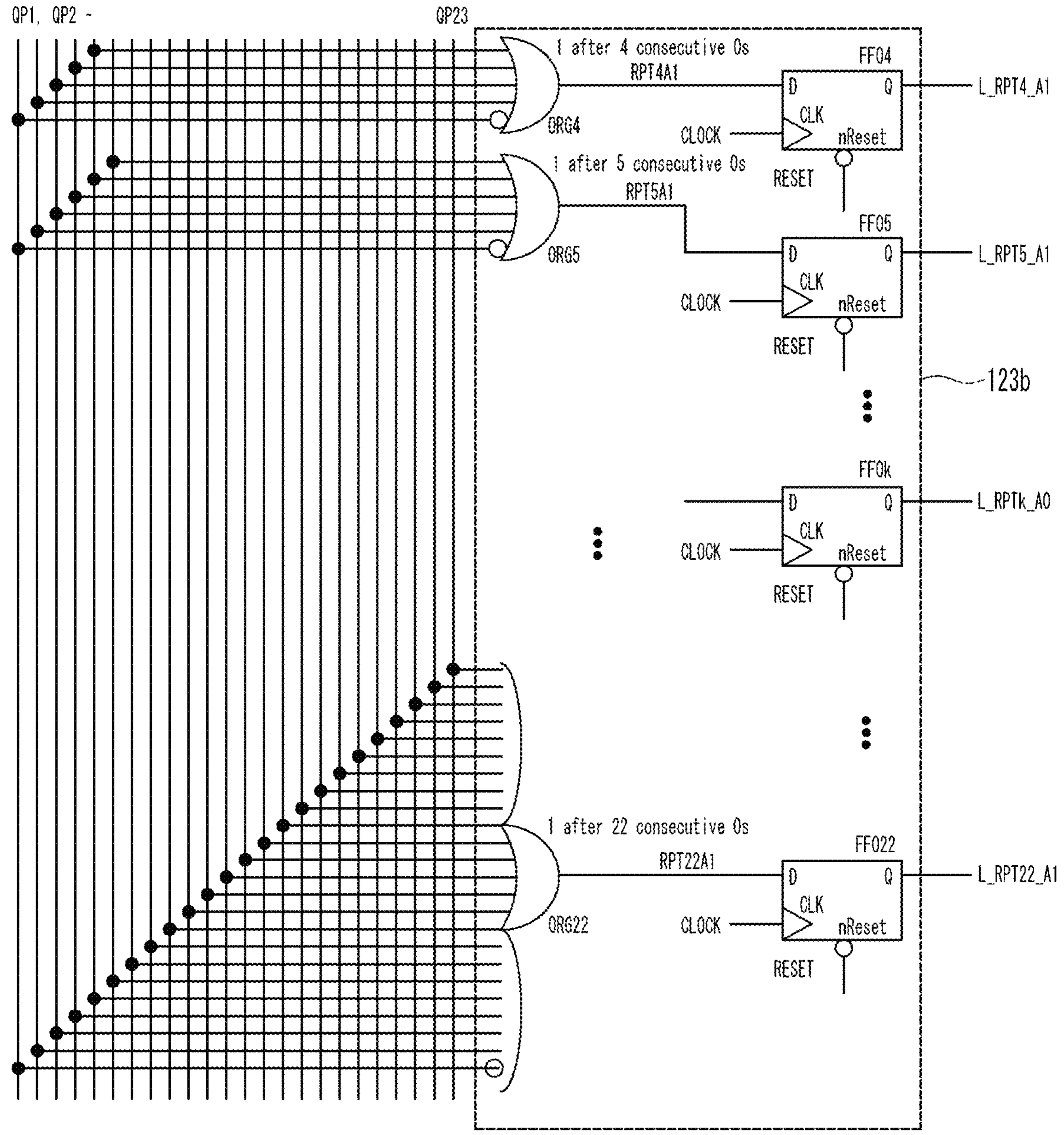
Figure 17:
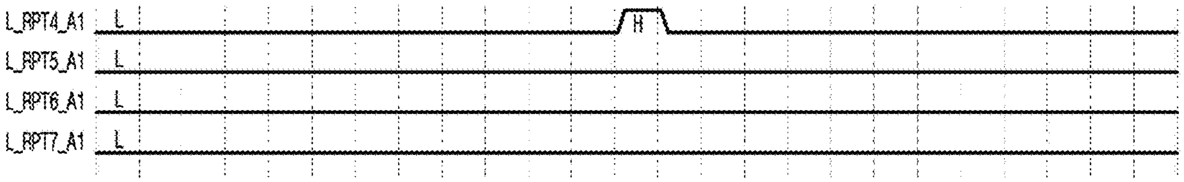

FIG. 14 and FIG. 16 show examples of implementation of a first pattern detector and a second pattern detector illustrated in FIG. 7 according to the second embodiment, and FIG. 15 and FIG. 17 show examples of first pattern detection signals and second pattern detection signals output from the first pattern detector and the second pattern detector of FIG. 14 and FIG. 16 according to the second embodiment.

The pattern detector 123 illustrated in FIG. 7 can include the first pattern detector 123*a* and the second pattern detector 123*b*, as illustrated in FIG. 14 and FIG. 16. The first pattern detector 123*a* can be implemented based on a first logic circuit including AND gates AND4 to AND22, and first D flip-flops FFA4 to FFA22 (hereinafter, it may also be referred to as a (1-4)th pattern detection flip-flop FFA4 to a (1-22)th pattern detection flip-flop FFA22) each including a data input terminal D, a data output terminal Q, a clock input terminal CLK, and a reset input terminal nReset. The second pattern detector 123*b* can be implemented based on a second logic circuit including OR gates ORG4 to ORG22, and second D flip-flops FFO4 to FFO22 (hereinafter, it may also be referred to as a (2-4)th pattern detection flip-flop FFO4 to a (2-22)th pattern detection flip-flop FFO22) each including a data input terminal D, a data output terminal Q, a clock input terminal CLK, and a reset input terminal nReset.

The first pattern detector 123*a* can be implemented based on the AND gates AND4 to AND22 and the first D flip-flops FFA4 to FFA22 that operate based on a clock signal CLOCK and a reset signal RESET. The first pattern detector 123*a* can perform AND and NOT operations on the input data for each UI and detect whether input data includes data of L (or 0) after consecutive H (or 1). Therefore, at least one of the input terminals of the AND gates AND4 to AND22 can include a circuit such as an inverter capable of a NOT operation.

For example, assuming that the input serial data has a maximum of 22 UIs, the first pattern detector 123 *a* can start detecting whether the input serial data includes data of 0 (or L) after 4 consecutive 1s (or Hs) and perform the detection operation until detecting whether the input serial data includes data of 0 after 22 consecutive 1s. For example, the first pattern detector 123*a* can detect whether the input serial data includes data of L (or 0) after consecutive Hs (or 1) by performing AND and NOT operations on the input serial data for each UI, and output first pattern detection signals L_RPT4_A0 to L_RPT7_A0 in a form as shown in FIG. 15.

Specifically, the fourth AND gate AND4 and the (1-4)th pattern detection flip-flop FFA4 can be defined as a circuit that detects whether serial data (Serial Data Input) includes data of 0 after 4 consecutive 1s. A fourth AND gate output signal RPT4A0 output from the fourth AND gate AND4 can be applied to the (1-4)th pattern detection flip-flop FFA4, delayed for 1 clock, and then output as the (1-4)th pattern detection signal L_RPT4_A0. The 22nd AND gate AND22 and the (1-22)th pattern detection flip-flop FFA22 can be defined as a circuit that detects whether the serial data (Serial Data Input) includes data of 0 after 22 consecutive 1s. A 22nd AND gate output signal RPT22A0 output from the 22nd AND gate AND22 can be applied to the (1-22)th pattern detection flip-flop FFA22, delayed for 1 clock, and then output as the (1-22)th pattern detection signal L_RPT22_A0.

As illustrated in FIG. 16, the second pattern detector 123*b* can be implemented based on OR gates ORG4 to ORG22 and second D flip-flops FFO4 to FFO22 that operate based on the clock signal CLOCK and the reset signal RESET. The second pattern detector 123*b* can perform an OR operation and a NOT operation on input data for each UI and detect whether the input data includes data of H (or 1) after consecutive Ls (or 01). Accordingly, at least one of the input terminals of the OR gates ORG4 to ORG22 can include a circuit such as an inverter capable of a NOT operation.

For example, assuming that the input serial data (Serial Data Input) has a maximum of 22 UIs, the second pattern detector 123*b* can start detecting whether the input serial data includes data of 1 after 4 consecutive 0s and perform the detection operation until detecting whether the input serial data includes data of 1 after 22 consecutive 0s. For example, the second pattern detector 123*b* can perform OR and NOT operations on the input data for each UI, detect whether the input data includes data of H (or 1) after consecutive Ls (or 0s), and output second pattern detection signals L_RPT4_A1 to L_RPT7_A1 in a form as shown in FIG. 17.

Specifically, the fourth OR gate ORG4 and the (2-4)th pattern detection flip-flop FFO4 can be defined as a circuit that detects whether the serial data (Serial Data Input) includes data of 1 after having 4 consecutive 0s. A fourth OR gate output signal RPT4A1 output from the fourth OR gate ORG4 can be applied to the (2-4)th pattern detection flip-flop FFO4, delayed for 1 clock, and then output as the (2-4)th pattern detection signal L_RPT4_A1. The 22nd OR gate ORG22 and the (2-22)th pattern detection flip-flop FFO22 can be defined as a circuit that detects whether the serial data (Serial Data Input) includes data of 1 after having 22 consecutive 0s. A 22nd OR gate output signal RPT22A1 output from the 22nd OR gate ORG22 can be applied to the (2-22)nd pattern detection flip-flop FFO22, delayed for 1 clock, and then output as the (2-22)th pattern detection signal L_RPT22_A1.

Figure 18:
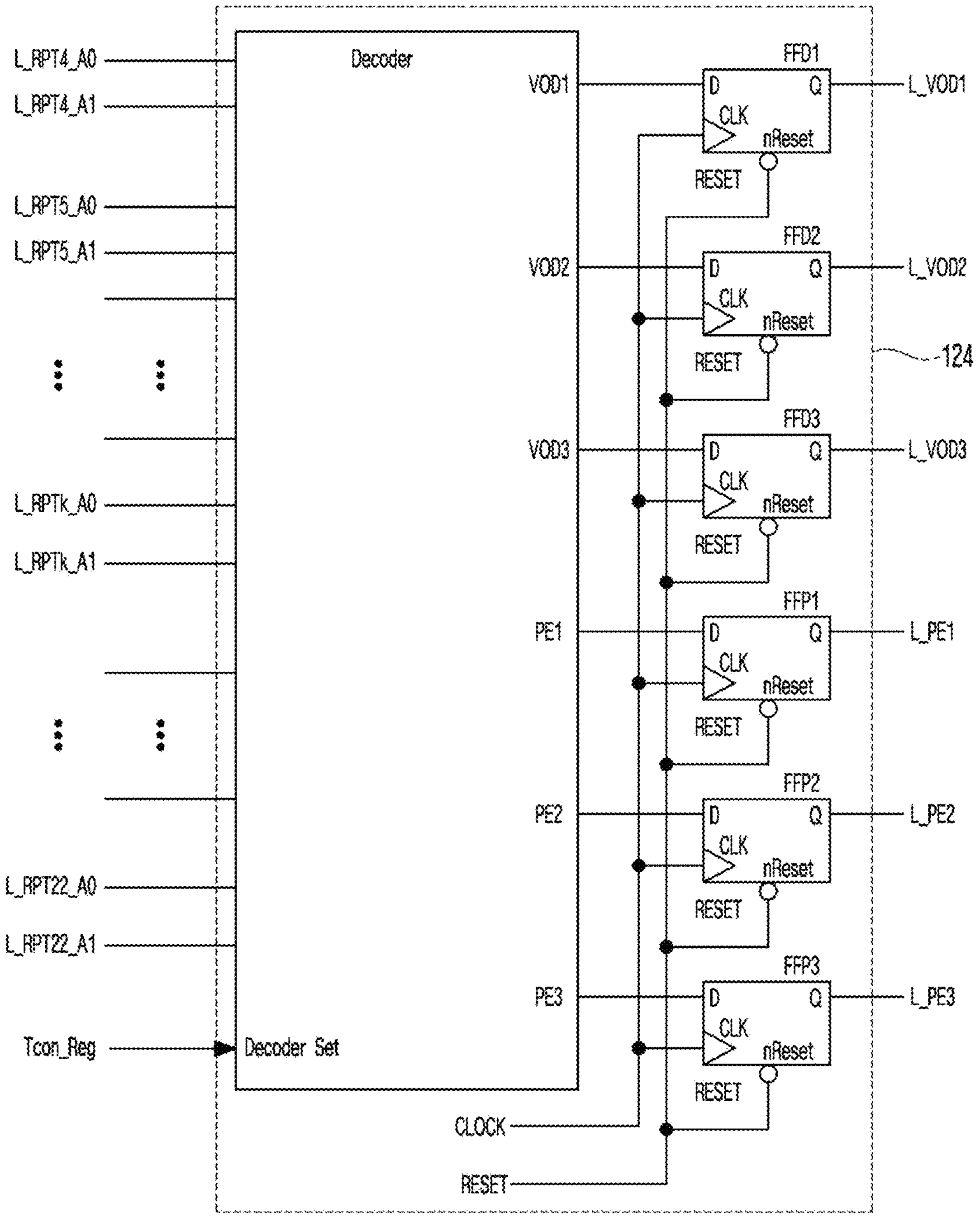
FIG. 18 shows an example of implementation of a pattern determination circuit illustrated in FIG. 7 according to the second embodiment of the present disclosure.

FIG. 18 shows an example of implementation of the pattern determination circuit illustrated in FIG. 7 according to the second embodiment of the present disclosure.

The pattern determination circuit 124 illustrated in FIG. 7 can be implemented based on a decoder and D flip-flops FFD1 to FFD3 and FFP1 to FFP3 (hereafter, it may be referred to as pattern determination D flip-flops FFD1 to FFD3 and FFP1 to FFP3) each including a data input terminal D, a data output terminal Q, a clock input terminal CLK, and a reset input terminal nReset, as illustrated in FIG. 18. The decoder can further include a decoder set input terminal Decoder Set through which a register signal Tcon_Reg output from the timing controller is received. The decoder can change a decoding policy provided therein in response to the register signal Tcon_Reg.

The decoder can decode the first pattern detection signals L_RPT4_A0 to L_RPT22_A0 of the first pattern detector 123*a* illustrated in FIG. 14 and the second pattern detection signals L_RPT4_A1 to L_RPT22_A1 of the second pattern detector 123*b* illustrated in FIG. 16 to output signals for adjusting the output strength of at least one of VOD or PE.

The decoder can decode the first pattern detection signals L_RPT4_A0 to L_RPT22_A0 and the second pattern detection signals L_RPT4_A1 to L_RPT22_A1 to output VOD signals VOD1 to VOD3 for controlling the level of a differential voltage and PE signals PE1 to PE3 for controlling pre-emphasis of the differential voltage. The VOD signals VOD1 to VOD3 and PE signals PE1 to PE3 output from the decoder are applied to the pattern determination D flip-flops FFD1 to FFD3 and FFP1 to FFP3, and the pattern determination D flip-flops FFD1 to FFD3 and FFP1 to FFP3 can delay the VOD signals VOD1 to VOD3 and PE signals PE1 to PE3 for 1 clock and then output VOD control signals L_VOD1 to L_VOD3 and PE control signals L_PE1 to L_PE3.

For example, among the VOD control signals L_VOD1 to L_VOD3 and the PE control signals L_PE1 to L_PE3 output from the decoder, the VOD1 control signal L_VOD1 and the PE1 control signal L_PE1 can be set to a first strength that is relatively lower than that of the VOD3 control signal L_VOD3 and the PE3 control signal L_PE3. On the other hand, the VOD3 control signal L_VOD3 and the PE3 control signal L_PE3 can be set to a third strength that is higher than that of the VOD1 control signal L_VOD1 and the PE1 control signal L_PE1. In addition, the VOD2 control signal L_VOD2 and the PE2 control signal L_PE2 can be set to a second strength between the first strength and the third strength. However, this is merely an example and the opposite is possible.

Figure 19:
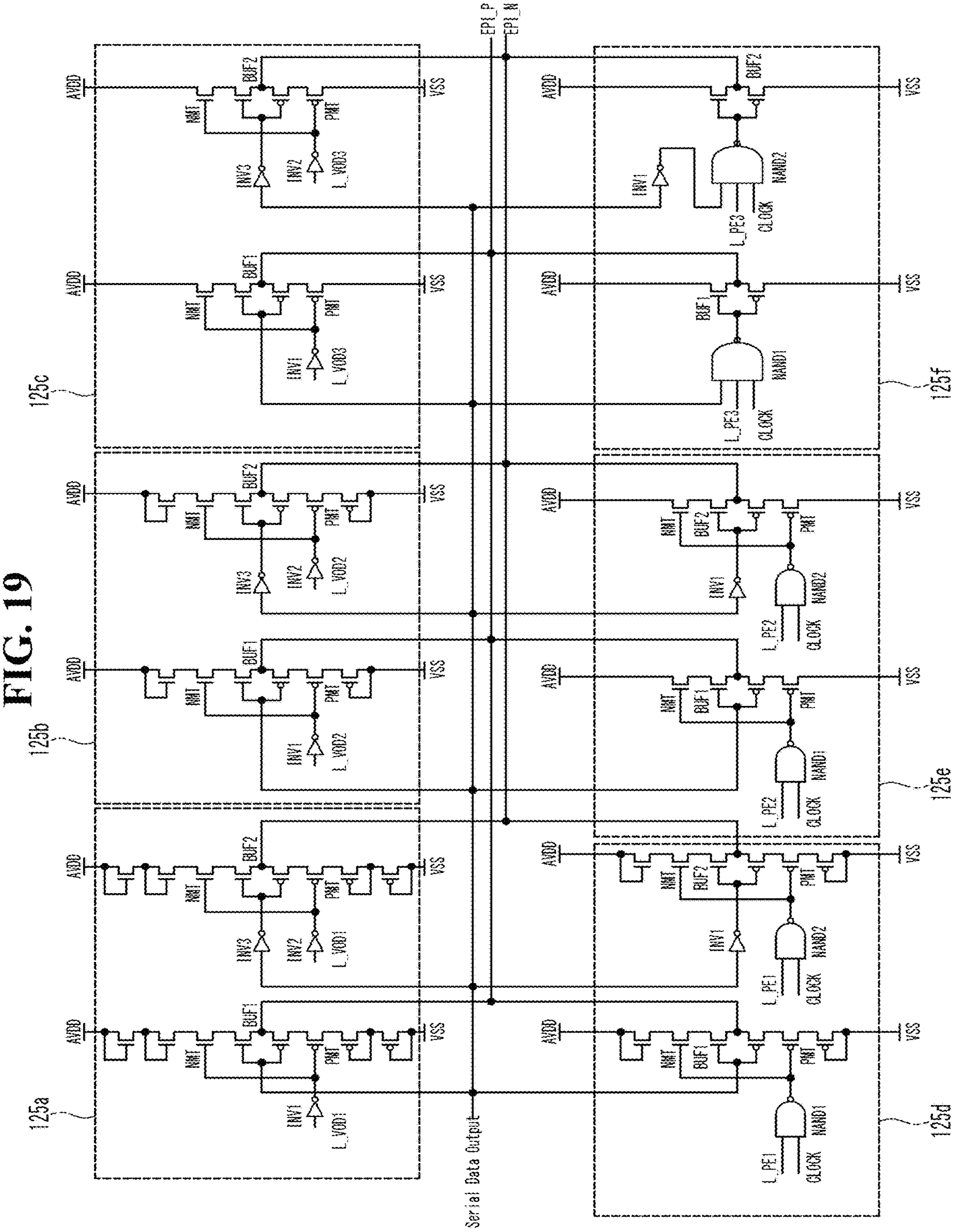
FIG. 19 shows an example of implementation of a driver illustrated in FIG. 7 according to the second embodiment of the present disclosure.
Figure 20:
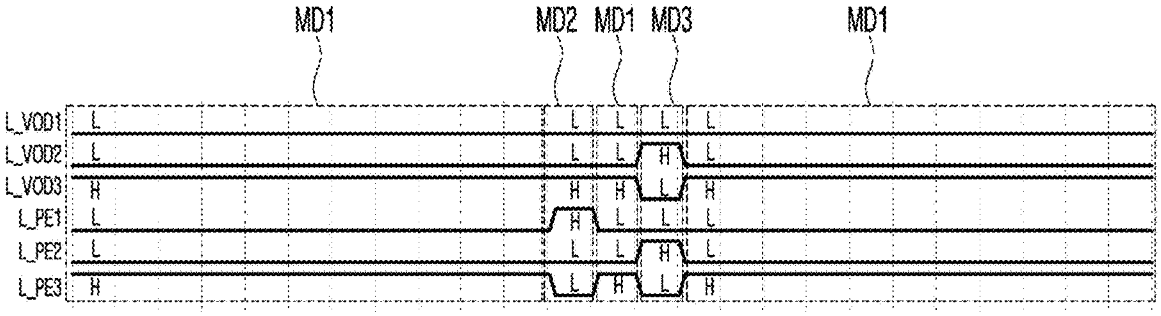
FIG. 20 shows examples of voltage of differential (VOD) control signals and pre-emphasis (PE) control signals input to the driver of FIG. 19.

FIG. 19 shows an example of implementation of the driver illustrated in FIG. 7 according to the second embodiment of the present disclosure, and FIG. 20 shows examples of VOD control signals and PE control signals input to the driver of FIG. 19 according to the second embodiment.

The driver 125 illustrated in FIG. 7 can generate a differential voltage for transmitting serial data (Serial Data Output) output from the first data storage 122*a* of FIG. 12 through the first transmission line EPI_P and the second transmission line EPI_N included in the EPI, as illustrated in FIG. 19. In addition, the driver 125 can adjust (change) the output strength of at least one of VOD or PE in the differential voltage based on the VOD control signals L_VOD1 to L_VOD3 and the PE control signals L_PE1 to L_PE3 output from the decoder of FIG. 18. Meanwhile, the part of the driver 125 to which the serial data (Serial Data Output) is applied can be defined as the input terminal of the driver 125, and the part connected to the first transmission line EPI_P and the second transmission line EPI_N can be defined as the output terminal of the driver 125.

The driver 125 can include first to sixth drivers 125*a* to 125*f*. The first to sixth drivers 125*a* to 125*f* drive and control the differential voltage for the first transmission line EPI_P and the second transmission line EPI_N, and thus can be paired (a pair of a positive driver and a negative driver). The first to sixth drivers 125*a* to 125*f* can be implemented using buffers BUF1 and BUF2, p-type transistors PMT, n-type transistors NMT, inverters INV1 to INV3, and NAND gates NAND1 and NAND2.

The buffers BUF1 and BUF2 can form a differential voltage including a positive voltage and a negative voltage on the first transmission line EPI_P and the second transmission line EPI_N in response to serial data (Serial Data Output) output from the first data storage 122*a*. The p-type transistors PMT and the n-type transistors NMT can operate to output signals to the buffers BUF1 and BUF2 in response to signals output from the first inverter INV1 and the second inverter INV2. The inverters INV1 to INV3 can invert signals from input terminals and output the same through output terminals. The NAND gates NAND1 and NAND2 can perform an NAND operation on signals applied through at least two input terminals and output signals to be applied to the p-type transistors PMT and the n-type transistors NMT through output terminals.

The first driver 125*a* to the third driver 125*c* can be defined as a circuit that controls VOD on the first transmission line EPI_P and the second transmission line EPI_N, and the fourth driver 125*d* to the sixth driver 125*f* can be defined as a circuit that controls PE on the first transmission line EPI_P and the second transmission line EPI_N.

The first driver 125*a* can include a first positive driver for controlling the VOD of the first transmission line EPI_P and a first negative driver for controlling the VOD of the second transmission line EPI_N. The first positive driver can include the first buffer BUF1, p-type transistors PMT, n-type transistors NMT, and the first inverter INV1, and the first negative driver can include the second buffer BUF2, p-type transistors PMT, n-type transistors NMT, the second inverter INV2, and the third inverter INV3. The first driver 125*a* can change the output strength of the VOD in the differential voltage based on a VOD1 control signal L_VOD1 applied to the first inverter INV1 included in the first positive driver and the second inverter INV2 included in the first negative driver.

The second driver 125*b* and the third driver 125*c* are similar to the first driver 125*a*, but differ from the first driver 125*a* in that the number of transistors in a diode-connected state between a first voltage line terminal AVDD for transmitting a positive voltage and a second voltage line terminal VSS for transmitting a negative voltage. For example, diode-connected transistors including two n-type transistors NMT and two p-type transistors PMT can be further disposed at the first voltage line terminal AVDD and the second voltage line terminal VSS of the first driver 125*a*. On the other hand, diode-connected transistors including one n-type transistor NMT and one p-type transistor PMT can be further disposed at the first voltage line terminal AVDD and the second voltage line terminal VSS of the second driver 125*b*. The first voltage line terminal AVDD and the second voltage line terminal VSS of the third driver 125*c* can have no additional diode-connected transistors other than the n-type transistor NMT and the p-type transistor PMT that operate based on the signals output from the first inverter INV1 and the second inverter INV2.

The first driver 125*a* to the third driver 125*c* can control a current/voltage based on a change in the on-resistance when the p-type transistors PMT or the n-type transistors NMT are turned on. For example, the first driver 125*a* has two more diode-connected transistors disposed at the positive voltage terminal and the negative voltage terminal, respectively, and thus can operate under the condition of the lowest first strength. The third driver 125*c* has no additional diode-connected transistors disposed at the positive voltage terminal and the negative voltage terminal, and thus can operate under the condition of the highest third strength. In addition, the second driver 125*b* has one more diode-connected transistor disposed at the positive voltage terminal and the negative voltage terminal, and thus can operate under the condition of the second strength between the first strength and the second strength. As described above, the first driver 125*a*, the second driver 125*b*, and the third driver 125*c* operate based on different control signals and can change the strength of VOD.

The fourth driver 125*d* can include a fourth positive driver for controlling the PE of the first transmission line EPI_P and a fourth negative driver for controlling the PE of the second transmission line EPI_N. The fourth positive driver can include the first buffer BUF1, p-type transistors PMT, n-type transistors NMT, and the first NAND gate NAND1, and the fourth negative driver can include the second buffer BUF2, p-type transistors PMT, n-type transistors NMT, the second NAND gate NAND2, and the first inverter INV1. The fourth driver 125*d* can control (change) the output strength of the PE in the differential voltage based on the clock signal CLOCK and the PE1 control signal L_PE1 applied to the first NAND gate NAND1 included in the fourth positive driver and the second NAND gate NAND2 included in the fourth negative driver.

The fifth driver 125*e* and the sixth driver 125*f* are similar to the fourth driver 125*d*, but differ from the fourth driver 125*d* in that there can be no additional diode-connected transistors provided to the first voltage line terminal AVDD for transmitting a positive voltage and the second voltage line terminal VSS for transmitting a negative voltage. For example, the first voltage line terminal AVDD and the second voltage line terminal VSS of the fourth driver 125*d* can further have diode-connected transistors including one n-type transistor NMT and one p-type transistor PMT. On the other hand, the first voltage line terminal AVDD and the second voltage line terminal VSS of the fifth driver 125*e* may not have additional transistors other than the n-type transistor NMT and the p-type transistor PMT that operate based on signals output from the first NAND gate NAND1 and the second NAND gate NAND2. In addition, unlike the fourth driver 125*d* and the fifth driver 125*e*, the sixth driver 125*f* includes the first buffer BUF1, the second buffer BUF2, the first NAND gate NAND1, and the second NAND gate NAND2, and serial data (Serial Data Output) output from the first data storage 122*a* can be applied to the sixth driver 125*f* through the input terminals of the first NAND gate NAND1 and the second NAND gate NAND2.

The fourth driver 125*d* to the sixth driver 125*f* also have different numbers of transistors disposed at the positive voltage terminal and the negative voltage terminal, similar to the first driver 125*a* to the third driver 125*c*, and thus the on-resistance can change in response to the number of transistors turned on. Accordingly, the fourth driver 125*d* to the sixth driver 125*f* can also operate based on different control signals and change the strength of PE. Meanwhile, the driver 125 can change the driving mode to a first mode MD1, a second mode MD2, or a third mode MD3, as shown in FIG. 20, in order to adjust the output strength of at least one of VOD or PE based on the VOD control signals L_VOD1 to L_VOD3 and the PE control signals L_PE1 to L_PE3 output from the pattern determination circuit 124 of FIG. 18.

In FIG. 20, a condition in which the VOD control signals L_VOD1 to L_VOD3 and the PE control signals L_PE1 to L_PE3 are "L_VOD1=L, L_VOD2=L, L_VOD3=H, L_PE1=L, L_PE2=L, and L_PE3=H", is defined as the first mode MD1. A condition in which the VOD control signals L_VOD1 to L_VOD3 and the PE control signals L_PE1 to L_PE3 are "L_VOD1=L, L_VOD2=L, L_VOD3=H, L_PE1=H, L_PE2=L, and L_PE3=L" is defined as the second mode MD2.

In addition, a condition in which the VOD control signals L_VOD1 to L_VOD3 and the PE control signals L_PE1 to L_PE3 are "L_VOD1=L, L_VOD2=H, L_VOD3=L, L_PE1=L, L_PE2=H, and L_PE3=L" is defined as the third mode MD3.

However, FIG. 20 illustrates an example for showing that the driver 125 can adjust the output strength of at least one of VOD or PE for each driving mode.

Figure 21:
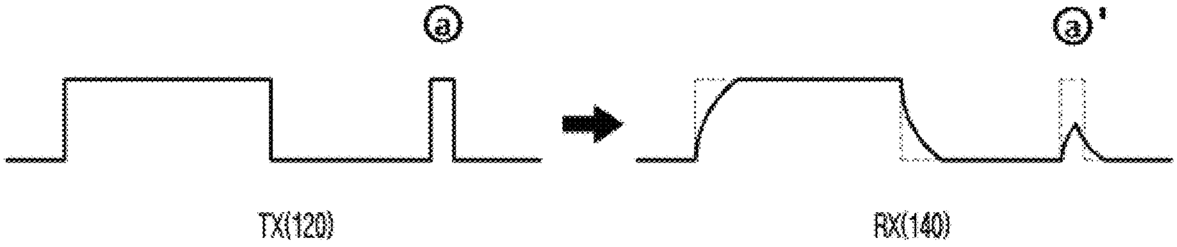
FIG. 21 shows an example for additional description of VOD and PE settings.

FIG. 21 shows an example to supplement description related to VOD and PE settings according to aspects of the present disclosure.

As shown in FIG. 21, when serial data ④ or ⓐ' toggled in only 1 UI is input, the data driver 140, which is a signal receiver RX, can accept the serial data input as the worst case, rather than the timing controller 120, which is a signal transmitter TX. Therefore, if it is desired to adjust the output strength of at least one of VOD or PE based on the method of the embodiment, the VOD and PE can be set with reference to the case of FIG. 21. However, this is merely an example for supplementing the description related to VOD and PE settings, and VOD and PE settings can vary depending on the device conditions of the timing controller 120 and the data driver 140, the driving environment, and the transmission lines provided therebetween, and the present disclosure is not limited thereto.

The embodiments of the present disclosure have the effects of achieving optimal current consumption by controlling the output strength of at least one of VOD or PE in a communication interface capable of transmitting and receiving various signals based on a differential signal. In addition, the embodiments of the present disclosure have the effects of reducing power consumption and EMI radiation based on a method of varying VOD and PE according to data.

It will be apparent to those skilled in the art that various modifications and variations can be made in the present disclosure without departing from the spirit or scope of the present disclosure. Thus, it is intended that the present disclosure cover the modifications and variations of the present disclosure provided they come within the scope of the appended claims and their equivalents.

What is claimed is:

1. A display device comprising:

a display panel configured to display an image;

a data driver configured to drive the display panel; and a timing controller configured to transmit various signals through an interface connected to the data driver, analyze a pattern of input data, and control an output strength of at least one of voltage of differential (VOD) or pre-emphasis (PE) with respect to an initial value, wherein the timing controller comprises:

a data storage configured to distribute and store the input data and then output pattern data;

a pattern detector including a first pattern detector configured to detect whether the pattern data output from the data storage includes data of 0 after consecutive 1s, and a second pattern detector configured to detect whether the pattern data includes data of 1 after consecutive 0s;

a pattern determination circuit configured to decode first pattern detection signals output from the first pattern detector and second pattern detection signals output from the second pattern detector, and output VOD control signals and PE control signals; and a driver configured to control the output strength of at least one of the VOD or PE based on the VOD control signals and the PE control signals output from the pattern determination circuit.

2. The display device of claim 1, wherein the data storage comprises:

a first data storage configured to temporarily store the input data and then output the input data unmodified to an input terminal of the driver of the timing controller; and a second data storage configured to distribute and store the input data and then output the pattern data.

3. The display device of claim 2, wherein the first data storage and the second data storage are configured using D flip-flops, and wherein each of the D flip-flops includes a data input terminal to which data is input, a data output terminal through which data is output, a clock input terminal to which a clock signal is input, and a reset input terminal to which a reset signal is input.

4. The display device of claim 1, wherein the first pattern detector comprises a first logic circuit configured to perform AND and NOT operations on the pattern data for each unit interval (UI).

5. The display device of claim 4, wherein the first pattern detector further comprises first D flip-flops configured to delay AND gate output signals output through the AND operation for one clock, and output the delayed AND gate output signals as the first pattern detection signals.

6. The display device of claim 1, wherein the second pattern detector comprises a second logic circuit configured to perform OR and NOT operations on the pattern data for each unit interval (UI).

7. The display device of claim 6, wherein the second pattern detector further comprises second D flip-flops configured to delay OR gate output signals output through the OR operation for one clock and output the delayed OR gate output signals as the second pattern detection signals.

8. The display device of claim 1, wherein the pattern determination circuit comprises:

a decoder configured to decode the first pattern detection signals output from the first pattern detector and the second pattern detection signals output from the second pattern detector; and D flip-flops configured to delay signals output from the decoder for one clock and output the delayed signals as the VOD control signals and the PE control signals.

9. A timing controller comprising:

a data storage configured to distribute and store input data and then output pattern data;

a pattern detector including a first pattern detector configured to detect whether the pattern data output from the data storage includes data of 0 after consecutive 1s, and a second pattern detector configured to detect whether the pattern data includes data of 1 after consecutive 0s;

a pattern determination circuit configured to decode first pattern detection signals output from the first pattern detector and second pattern detection signals output from the second pattern detector, and output voltage of differential (VOD) control signals and pre-emphasis (PE) control signals; and a driver configured to control an output strength of at least one of VOD or PE based on the VOD control signals and the PE control signals output from the pattern determination circuit.

10. The timing controller of claim 9, wherein the first pattern detector comprises:

a first logic circuit configured to perform AND and NOT operations on the pattern data for each unit interval (UI), and first D flip-flops configured to delay AND gate output signals output through the AND operation for one clock and output the delayed AND gate output signals as the first pattern detection signals.

11. The timing controller of claim 10, wherein the second pattern detector comprises:

a second logic circuit configured to perform OR and NOT operations on the pattern data for each UI, and second D flip-flops configured to delay OR gate output signals output through the OR operation for one clock and output the delayed OR gate output signals as the second pattern detection signals.

12. The timing controller of claim 9, wherein the pattern determination circuit comprises:

a decoder configured to decode the first pattern detection signals output from the first pattern detector and the second pattern detection signals output from the second pattern detector; and D flip-flops configured to delay signals output from the decoder for one clock and output the delayed signals as the VOD control signals and the PE control signals.

13. A display device comprising:

a display panel configured to display an image;

a data driver configured to drive the display panel; and a timing controller configured to supply signals to the data driver, wherein the timing controller comprises:

a pattern detector including a first pattern detector configured to detect whether pattern data includes data of 0 after consecutive 1s, and a second pattern detector configured to detect whether the pattern data includes data of 1 after consecutive 0s;

a pattern determination circuit configured to decode signals from the patten detector and output voltage of differential (VOD) control signals and pre-emphasis (PE) control signals; and a driver configured to control an output strength of at least one of VOD or PE based on the VOD control signals and the PE control signals output from the pattern determination circuit.

14. The display device of claim 13, wherein the timing controller further comprises:

a first data storage configured to temporarily store input data and then output the input data unmodified to an input terminal of the driver of the timing controller; and a second data storage configured to distribute and store the input data and then output the pattern data to be output to the pattern detector.

15. The display device of claim 14, wherein the first data storage and the second data storage are configured using flip-flops, and wherein each of the flip-flops includes a data input terminal to which data is input, a data output terminal through which data is output, a clock input terminal to which a clock signal is input, and a reset input terminal to which a reset signal is input.

16. The display device of claim 13, wherein the pattern determination circuit is configured to decode first pattern detection signals output from the first pattern detector, and wherein the first pattern detector comprises a first logic circuit configured to perform AND and NOT operations on the pattern data for each unit interval.

17. The display device of claim 16, wherein the pattern determination circuit is configured to decode second pattern detection signals output from the second pattern detector, and wherein the second pattern detector comprises a second logic circuit configured to perform OR and NOT operations on the pattern data for each unit interval.

18. The display device of claim 17, wherein the pattern determination circuit comprises:

a decoder configured to decode the first pattern detection signals output from the first pattern detector and the second pattern detection signals output from the second pattern detector; and flip-flops configured to delay signals output from the decoder for one clock and output the delayed signals as the VOD control signals and the PE control signals.

* * * * *